Dec. 11, 1951  B. J. THACKER ET AL  2,578,107
SHIPPING PACKAGE FOR STORAGE BATTERIES
Filed April 26, 1949
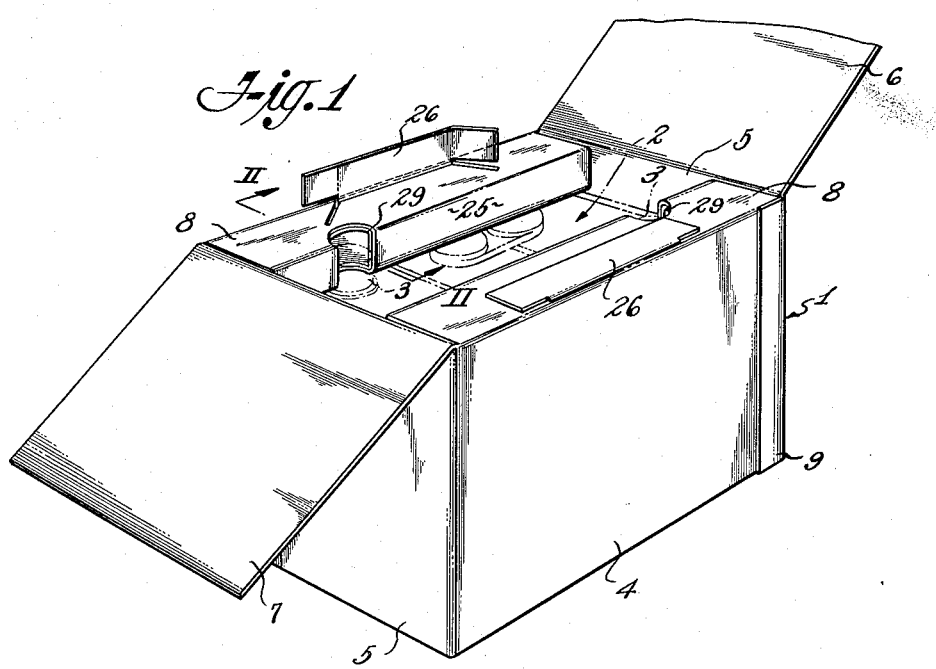
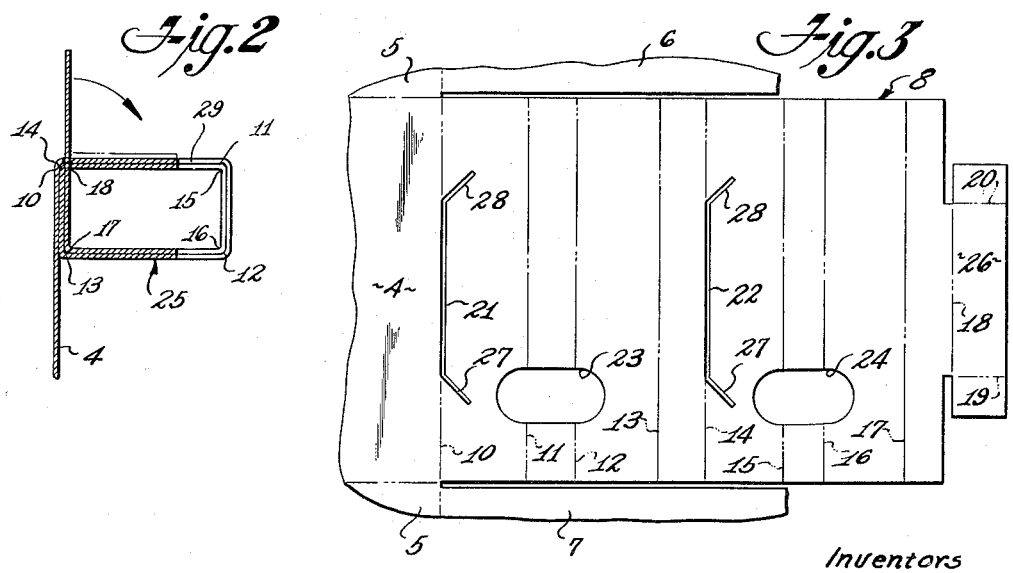
Inventors
BERNARD J. THACKER
SCOTT C. HARRIS
WALTER O. NEWSTROM
BY Fulwider & Mattingly
Attorneys

Patented Dec. 11, 1951

2,578,107

UNITED STATES PATENT OFFICE 2,578,107

SHIPPING PACKAGE FOR STORAGE BATTERIES

Bernard J. Thacker, Montebello, Scott C. Harris, Downey, and Walter O. Newstrom, Glendale, Calif., assignors to I. Henry Harris, Jr., Glendale, Calif.

Application April 26, 1949, Serial No. 89,644

3 Claims. (Cl. 229—14)

Our invention relates to shipping packages for the shipping of storage batteries and has particular reference to a package, container or carton for individually packaging an electric storage battery during transport and storage for the purpose of protecting the battery from shocks and particularly for the purpose of protecting the terminals of the battery when a number of batteries are stacked one upon another for shipment or storage.

It has recently become the custom to ship electric storage batteries while "wet," that is, with electrolyte already in place within the battery case and in order to protect such batteries during transport and storage it is necessary to provide a cushioning package for each individual battery to protect the case of the battery from injury due to shocks which might be sustained during transport or during the stacking of the batteries for storage. Particularly considerable difficulty has been encountered in properly protecting the upstanding terminals of the batteries of this type and manufacturers have employed various expedients for protecting such terminals such as the employment of wooden blocks disposed along the top of the battery case with holes or openings in such blocks to receive the upstanding terminals and thus transmit the shocks of stacking the batteries and also to transmit the weight of batteries piled upon another battery directly to the battery case instead of to the terminals.

It is an object of our invention to provide a package for the shipping and storage of electric storage batteries which may be readily constructed of cardboard, corrugated carton material and the like, in which a relatively simple container or carton may be readily manufactured entirely from the paper material of which cartons are usually constructed.

Another object of our invention is to provide a container or carton of the character described wherein the cardboard or paper material is blanked out to not only form a protective casing or hood surrounding the case of the storage battery with which it is to be used but the blank also includes additional tabs which may be rolled up to form a spacer or terminal protector integral with the remaining portions of the carton or container.

Another object of our invention is to provide a novel construction for a paper or cardboard shipping container for storage batteries wherein the tabs formed integrally with the side walls of the carton may each be rolled upon itself through a plurality of convolutions to form a terminal protecting cushion and in which the tab may be preformed with openings arranged in such fashion that the rolled tab will be provided with battery terminal receiving recesses.

Another object of our invention is to provide a carton or container of the character described, in which the tabs for protecting the battery terminals are properly scored at the points of bending of the tabs upon themselves to facilitate the rolling of the tabs to form the cushions and to insure uniformity of the cushions in all of the containers or cartons.

Other objects and advantages of the invention will be apparent from a study of the following specification, read in connection with the accompanying drawing, wherein Fig. 1 is a perspective view of a carton or container constructed in accordance with our invention and illustrating the manner in which the rolled tabs constitute cushioning structures for the battery terminals;

Fig. 2 is a detail sectional view taken along the plane indicated at II—II of Fig. 1 and illustrating the manner in which the battery terminal cushion is constructed by the mere rolling of the cushion tab upon itself; and Fig. 3 is a detail plan view of a portion of the container shown in Fig. 1 and illustrating the battery terminal cushioning tab as it is blanked from the cardboard or paper material from which the carton is to be made.

Referring to the drawings, there is illustrated in Fig. 1 a package or container for storage batteries indicated generally by the reference character 1, said container being referred to in the industry as a "hood" in that it may not be provided with a bottom but may be constructed in the shape of an open bottomed carton or container adapted to be slipped over the top of a storage battery 2 to act as a protecting packaging member for the case of the battery and also as a protecting device for the terminals 3 of the battery 2.

In the form illustrated herein, the package or container comprises a single piece of corrugated paper carton material corresponding in all respects to the material commonly employed in paper or cardboard cartons of the type generally used for the packaging and shipment of various articles and materials. This single piece of material is cut from a sheet of material, preferably by suitable blanking dies which cut the material in such fashion as to provide connected side walls 4, end walls 5, cover flaps 6 and 7 and cushioning tabs 8 adapted to be arranged to extend over and protect the terminals 3 of a storage battery contained within the finished package or container. Preferably, one of the end walls is joined to one of the side walls by a suitable adhesive strip indicated at 9 in the same manner as cartons of this character are usually constructed.

The tabs 8 are preferably formed as extensions of the side walls 4 and comprise a strip of the paper or cardboard material scored for folding along the lines indicated at 10, 11, 12, 13, 14, 15, 16, 17, 18, 19 and 20, and punched or cut as indicated at 21 and 22 and as indicated at 23 and 24. The scoring lines 11, 12, 13, 14, 15, 16 and 17 define lines of folding by which the tab material may be rolled upon itself several times or in several convolutions as shown in Fig. 2 to form a hollow paper or cardboard cushion indicated by the reference character 25 disposed immediately below the upper edge of the side wall 4 of the hood or container and extending along the side wall immediately above the side edges of the case of the storage battery 2. The spacing of the scoring lines 10, 11, 12, 13, 14, 15, 16 and 17 and the scoring line 18 is selected such that the distance between the lines 17 and 18 and the lines 13 and 14 will permit the material between lines 17 and 18 to nest within the fold between the lines 13 and 14.

Similarly, the spacing between the lines 15 and 16 and the lines 11 and 12 is such that the material between the lines 15 and 16 will nest within the strip of material between the lines 11 and 12 so that the finished cushion 25 comprises a double thickness of the paper or cardboard material and by reason of the fact that there is a double thickness and that the material between the scoring lines has considerable rigidity, the cushion will act to support relatively great shocks and great loads.

In order to maintain the cushion 25 in its desired shape, the outer end of each of the tabs 8 is provided with an extension 26 defined between the scoring line 18 and the end of the tab, which extension is inserted first through the slot indicated at 22 and as the material is continued to be rolled the extension 26 is finally inserted through the slot indicated at 21 to act as a lock for the rolled up material.

As indicated in Figs. 1 and 3, the slots 21 and 22 are preferably formed with their ends disposed at an angle to the major portion of the slot, as is indicated at 27 and 28 so that the side edges of the extension 26 between the extreme edge of the extension and the scoring lines 19 and 20, respectively, must be bent away from their normal plane in order to permit their insertion through the angular portions 27 and 28 of the slots. This arrangement is particularly shown at the left-hand side of Fig. 1. Then the extensions 26 may be laid flat along the upper surface of the cushion 25, as indicated particularly at the right hand side of the carton shown in Fig 1. Thus the folding of the two flaps 6 and 7 into a plane parallel with the upper edges of the side walls is not interfered with and, in fact, the flaps 6 and 7 serve to insure retention of the locking extension 26 in place.

In forming the blank for the tabs 8, we prefer to cut out the portions as indicated at 23 and 24 so that when the tabs are rolled as indicated in Figs. 1 and 2, the cut out portions 23 and 24 will provide a recess 29 adapted to receive the upstanding terminals 3 of the storage battery. At this point it should be noted that the vertical portion of the cushioning 25 should be slightly greater than the height of the exposed terminals 3 so that when a battery is placed upon a hooded or cartoned lower battery in a stack, the weight of the upper battery or batteries will be transmitted by the cushion 25 directly to the upper surface of the battery case and no weight or pressure will be exerted upon the terminals 3.

Thus it will be apparent that we have provided a battery "hood" or carton which may be readily formed from a single piece of cardboard or paper material, utilizing methods for cutting and scoring such as are commonly employed in the manufacture of packaging cartons and in which, in addition to a protective housing for the batteries, additional integrally formed cushions are provided to extend above and protect the terminals of the batteries from shocks and weight during transportation and storage of the batteries.

Thus separate cushioning devices are avoided and each blank contains all of the elements necessary to make both of the protective housing and the terminal cushions.

While we have shown and described the preferred embodiment of our invention, we do not desire to be limited to any of the details of construction shown and described herein, except as defined in the appended claims.

We claim:

1. In a container for packaging storage batteries, a container formed of paper carton material having integral side and end walls and having integral tabs extending from the upper edges of the side wall portions of such length as will permit the tab to be rolled upon itself throughout at least more than one convolution to constitute a cushion at the upper edge of the side walls to engage the case of a storage battery and to protect the upstanding terminals of the battery, an extension on each of the tabs, and registering slots formed through overlapping convolutions of the tab material for receiving the extensions to lock the rolled up tabs in rolled position.

2. In a container for packaging storage batteries, a container formed of paper carton material having integral side and end walls and having integral tabs extending from the upper edges of the side wall portions of such length as will permit the tab to be rolled upon itself throughout at least more than one convolution to constitute a cushion at the upper edge of the side walls to engage the case of a storage battery and to protect the upstanding terminals of the battery, an extension on each of the tabs, slots formed through the tab material for receiving the extensions to lock the rolled up tabs in rolled position, said slots extending substantially parallel to the upper edge of the side wall throughout the major portion of the length of the slot, and said slots having end portions disposed at an angle to the upper edge of said side walls.

3. In a container for packaging storage batteries, a container body formed of paper carton material having integral side and end walls, integral tabs extending from the upper edges of the side walls and rolled upon themselves whereupon a portion of each tab will overlap another portion thereof to provide a cushion at the upper edge of each of the side walls, said cushions extending inwardly from said upper edges, an extension on each tab, and registering slots formed through the overlapped portions of each tab to receive said extensions and lock the rolled tabs in their rolled positions.

BERNARD J. THACKER.
SCOTT C. HARRIS.
WALTER O. NEWSTROM.

REFERENCES CITED

The following references are of record in the file of this patent:

UNITED STATES PATENTS

| Number | Name | Date |
|---|---|---|
| Re. 19,181 | Boeye | May 29, 1934 |
| 1,879,105 | Coriglianl | Sept. 27, 1932 |
| 1,965,215 | Boeye | July 3, 1934 |
| 2,393,734 | Beardsell | Jan. 29, 1946 |